(12) United States Patent
Sakaue

(10) Patent No.: US 6,708,068 B1
(45) Date of Patent: Mar. 16, 2004

(54) MACHINE COMPRISED OF MAIN MODULE AND INTERCOMMUNICATING REPLACEABLE MODULES

(75) Inventor: Masaya Sakaue, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 239 days.

(21) Appl. No.: 09/627,507

(22) Filed: Jul. 28, 2000

(30) Foreign Application Priority Data

Jul. 28, 1999 (JP) .......................................... 11-213941

(51) Int. Cl.$^7$ ............................................. G05B 13/02
(52) U.S. Cl. .......................... 700/47; 700/87; 700/245; 700/247; 700/250; 700/169; 700/181; 713/100; 318/568.11; 318/568.12; 318/568.13
(58) Field of Search ........................ 318/568.12, 568.13, 318/568.11; 700/47, 247, 250, 87, 245, 169, 181; 713/100

(56) References Cited

U.S. PATENT DOCUMENTS

| | | | | |
|---|---|---|---|---|
| 5,212,645 A | * | 5/1993 | Wildes et al. ................ 700/108 |
| 5,220,260 A | * | 6/1993 | Schuler, et al. .............. 318/561 |
| 5,428,713 A | | 6/1995 | Matsumaru |
| 5,687,098 A | * | 11/1997 | Grumstrup et al. .......... 700/282 |
| 5,739,657 A | * | 4/1998 | Takayama et al. ........... 318/587 |
| 5,870,730 A | * | 2/1999 | Furuya et al. ................ 706/47 |
| 6,411,055 B1 | * | 6/2002 | Fujita et al. ............ 318/568.12 |

FOREIGN PATENT DOCUMENTS

| | | |
|---|---|---|
| DE | 19624929 A1 | 1/1998 |
| EP | 0 818 283 A1 | 1/1998 |
| EP | 0 924 034 A2 | 6/1999 |

* cited by examiner

Primary Examiner—Anil Khatri
Assistant Examiner—Douglas M. Shute
(74) Attorney, Agent, or Firm—Knobbe, Martens, Olson & Bear LLP

(57) ABSTRACT

A machine, functioning as a unit, is composed of a main module and at least one replacable module having an ID. The main module includes (i) an ID recognition unit programmed to receive ID information from each replacable module, and (ii) an action decision unit including a decision algorithm programmed to select an action based on preselected signals. The decision algorithm is adjusted based on the ID information. The at least one replacable module includes (iii) an ID information unit storing ID information identifying the at least one replaceable module, and (iv) an action actuation unit including an action algorithm programmed to actuate the at least one replaceable module based on signals from the action decision unit; wherein the main module and the at least one replaceable module are communicated via an interface. The decision algorithm provided in the main module is adjusted based on the ID information, so that proper control can always be accomplished adaptively to the used replacable module.

8 Claims, 7 Drawing Sheets

MACHINE COMPRISED OF MAIN MODULE AND INTERCOMMUNICATING REPLACEABLE MODULES

BACKGROUND OF THE INVENTION

1. Field of the Invention

This invention relates to a machine control system to be applied to various interactive-type machines for robot devices, navigation, vending machines, automatic reception and others to be used for toys, games, public welfare, industrial use, and others.

2. Description of the Related Art

Recently, a pet-type of robot which can communicate with the user so that the robots become attached to the user by learning and expressing their emotions with distinctive motions has been produced on a commercial basis. For example, in Japanese Patent Laid-open No. 1999-126017 by Sony Corporation, if the user praises a pet when it barks, it is disciplined to bark by lowering its trigger level for barking and conversely if the user is angered when it barks, it is disciplined to be a quiet pet and, in this way, the character and behavioral disposition of the pet are changed according to the attitude of the user and these changes are learned. Additionally, learning processing allows a pet to learn various tricks.

However, with the above-mentioned conventional robots there are limits in making progress by learning because the number of sensors and information volume for storing information for a robot to learn and memory capacity which stores learning results and behavioral patterns to be selected are all limited. As a result, after a certain amount of time elapses, how a robot behaves can be predicted by the user and there is the possibility that the user may lose interest in the robot.

SUMMARY OF THE INVENTION

This invention is to solve the above-mentioned conventional problem and aims at making devices, which constitute a machine such as a robot, replaceable by modularizing it and enabling changes in various behaviors to be made by replacing modules, and at the same time, it aims at providing a machine control system which can keep developing even after a module is replaced.

To achieve the above-mentioned objects, the present invention provides embodiments including a machine, functioning as a unit, composed of a main module and at least one replaceable module having an ID. The main module comprises (i) an ID recognition unit programmed to receive ID information from each replaceable module, and (ii) an action decision unit comprising a decision algorithm programmed to select an action based on preselected signals, said decision algorithm being adjusted based on the ID information. The at least one replaceable module comprises (iii) an ID information unit storing ID information identifying said at least one replaceable module, and (iv) an action actuation unit comprising an action algorithm programmed to actuate said at least one replaceable module based on signals from said action decision unit; wherein said main module and said at least one replaceable module are communicated via an interface. According to this embodiment, the modules are replaceable, and each module comprises own control system and has an ID. The main module receives ID information from the replaceable module, and the decision algorithm provided in the main module is adjusted based on the ID information, so that proper control can always be realized adaptively to the used replaceable module. For example, if the machine is a robot, the main module may be a body, and said at least one replaceable module may be selected from self-propelling legs, self-propelling wheels, and self-propelling caterpillars. Although their behavior is very different to accomplish the same task such as moving forward and turning right, the robot can accomplish the task after changing the modules.

In the above, in one embodiment, the ID information may includes action profiles and action threshold values at which respective predetermined actions are triggered, and said decision algorithm includes action thresholds which are updated by said action threshold values. In the embodiment, the machine can behave in accordance with the action threshold values stored in the replaceable module. For example, if the machine is a robot, and self-propelling arms having different power levels and different action threshold values are used as replaceable modules, by changing arms, the robot can change from a low-responsive weak fighter to a high-responsive strong fighter.

In the above, when the at least one replaceable module is at least two replaceable modules, the main module may further comprise an action coordination unit provided downstream of the action decision unit to coordinate actions of the respective replaceable modules, wherein said action actuation unit receives signals from said action coordination unit.

In another embodiment of the present invention, the ID information may include only minimum information to identify the module, and the ID recognition unit may further comprise a memory storing (a) action profiles and action threshold values at which predetermined actions are triggered with reference to each ID, and (b) default profiles and action threshold values, wherein if the received ID is not new, corresponding information is retrieved from the memory, and if the received ID is new, the default information is used. Thus, the ID information can contain either full information or minimum information, or something therebetween.

Further, in another embodiment, because the replaceable module comprises a control unit (including an action algorithm), the algorithm can be adjusted in accordance with the main module. That is, the main module further comprises an ID information unit storing ID information including profiles of said main module, and the at least one replaceable module further comprises an ID recognition unit programmed to receive ID information from said main module, wherein said action algorithm of said action actuation unit is adjusted by the ID information from said main module. In this embodiment, if a heavy main module is used instead of a light one, leg movement can be adjusted accordingly.

In an embodiment of the present invention, the machine can learn and adjust the control system accordingly. In the embodiment, one of the modules may be provided with a detection unit programmed to detect a deviation of the actuated action from the selected action, and at least either of said action algorithm or said decision algorithm is modified based on the deviation. Additionally, the machine is a robot wherein the main module is a body including a head provided with a sensing unit connected to the detection unit.

The present invention can equally be adapted to a method of controlling a machine based on the above. Further, the present invention provides a set of replaceable modules set forth above, which comprise self-propelling legs, self-propelling wheels, and self-propelling caterpillars, and/or a set of replaceable modules set forth above, which comprise self-propelling arms having different power levels and different action threshold values.

For purposes of summarizing the invention and the advantages achieved over the prior art, certain objects and advantages of the invention have been described above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description of the preferred embodiments which follow.

BRIEF DESCRIPTION OF THE DRAWINGS

These and other features of this invention will now be described with reference to the drawings of preferred embodiments which are intended to illustrate and not to limit the invention.

DETAILED DESCRIPTION OF THE PREFERRED EMBODIMENT

This invention is explained referring to the figures in the section which follows.

Figure 1:
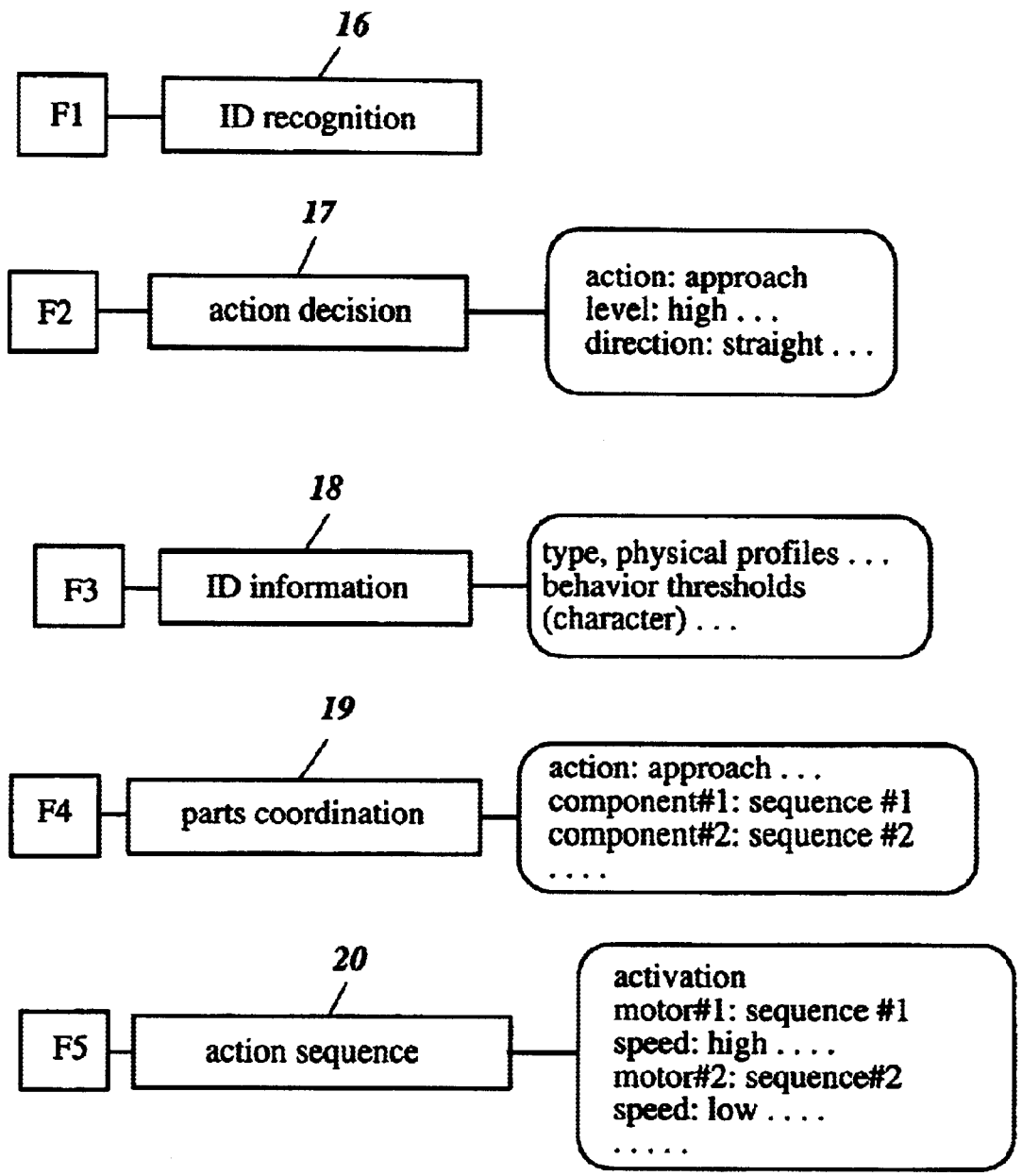
FIG. 1 is a schematic diagram showing examples of function units which may be installed in the modules.

In the present invention, the machine functions as a unit and is composed of a main module and at least one replaceable module having an ID. The main module and the replaceable modules may comprise the following as shown in FIG. 1:

(i) Aan ID recognition unit programmed to receive ID information from each replacable module (in FIG. 1, "F1", an ID recognition 16).

(ii) An action decision unit comprising a decision algorithm programmed to select an action based on preselected signals (in FIG. 1, "F2", an action decision 17). The decision algorithm can be of any type which selects an action in sequence based on preselected signals. The decision algorithm may provide an outcome such as "action: approach", "level: high", "direction: straight", etc., as shown in FIG. 1.

Figure 5:
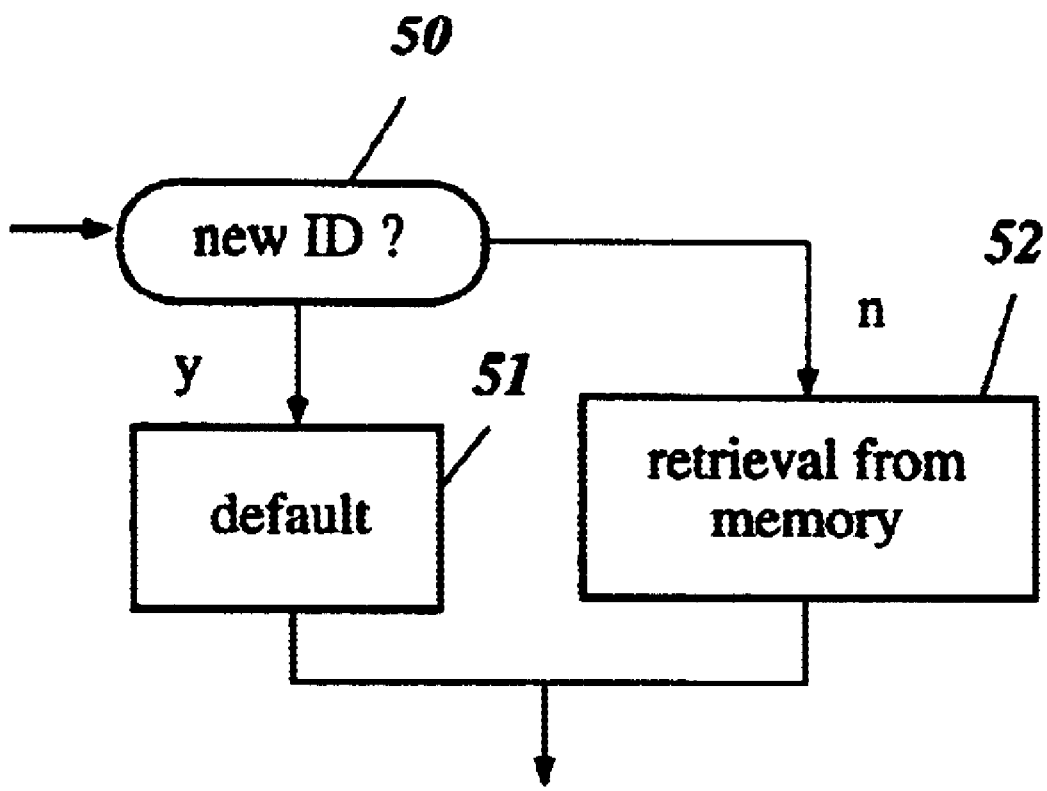
FIG. 5 is a schematic diagram showing another example of the ID recognition unit.

(iii) An ID information unit storing ID information identifying said at least one replaceable module (in FIG. 1, "F3", an ID information 18). The ID information may include the type of module, physical profiles, behavior library, behavior thresholds, etc., as shown in FIG. 1. In another embodiment, the ID information may include only minimum information to identify the module if the ID recognition unit further comprises a memory storing (a) action profiles and action threshold values at which predetermined actions are triggered with reference to each ID, and (b) default profiles and action threshold values (as shown in FIG. 5). If the received ID (numeral 50 in FIG. 5) is not new, corresponding information (numeral 52 in FIG. 5) is retrieved from the memory, and if the received ID is new, the default information (numeral 51 in FIG. 5) is used. Thus, the ID information can contain either full information or minimum information, or something therebetween.

(iv) An action actuation unit comprising an action algorithm programmed to actuate said at least one replaceable module based on signals from said action decision unit (in FIG. 1, "F5", an action sequence 20). The action algorithm can be of any type which controls movement of the particular module based on information from the action decision unit. The action algorithm may provide an outcome such as "activation of motor #1 in sequence #1 at a high speed", "activation of motor #2 in sequence #2 at a low speed", etc., as shown in FIG. 1.

(v) An action coordination unit provided downstream of the action decision unit to coordinate actions of the respective replaceable modules (in FIG. 1, "F4", a parts coordination 19). This unit is not indispensable, but when the at least two replaceable modules are used, the main module further comprises this unit wherein said action actuation unit receives signals from said action coordination unit. The coordination unit may control each module by controlling "component (module) #1 in sequence #1 while controlling "component (module) #2 in sequence #2 to accomplish an approaching action, as shown in FIG. 1.

In addition to the above, the following units can be installed: (vi) an emotion generation unit programmed to generate emotions used as parameters triggering actions, (vii) a character (personality) formation unit programmed to form personality based on long term behavioral records, (viii) a new behavior generation unit programmed to generate new behavioral patterns randomly or under predetermined rules.

With regard to the above described units and algorithms, the following U.S. applications are herein incorporated by reference: U.S. application Ser. No. 09/059,278, filed Apr. 13, 1998, entitled "Control System for Controlling Object Using Pseudo-Emotions Generated in the Object"; U.S. application Ser. No. 09/129,853, filed Aug. 6, 1998, entitled "Control System for Controlling Object Using Pseudo-Emotions Generated in the Object"; U.S. application Ser. No. 09/130,212, filed Aug. 6, 1998, entitled "Control System for Controlling Object Using Pseudo-Emotions and Pseudo-Personality Generated in the Object"; U.S. application Ser. No. 09/393,247, filed Sep. 10, 1999, entitled "Interactive Artificial Intelligence"; U.S. application Ser. No. 09/393,146, filed Sep. 10, 1999, entitled "Interactive Artificial Intelligence"; U.S. application Ser. No. 09/394,369, filed Sep. 10, 1999, entitled "Interactive Artificial Intelligence".

Figure 2:
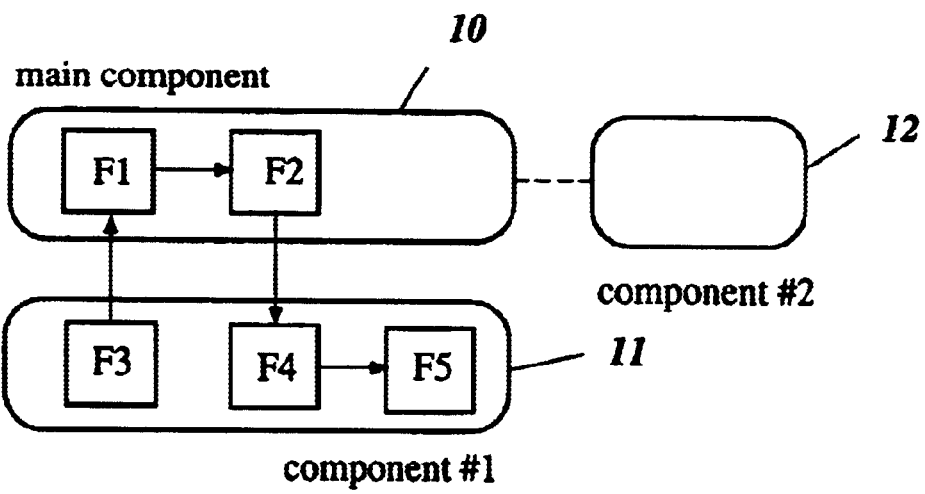
FIG. 2 is a schematic diagram showing an example of allocated function units between the modules.
Figure 3:
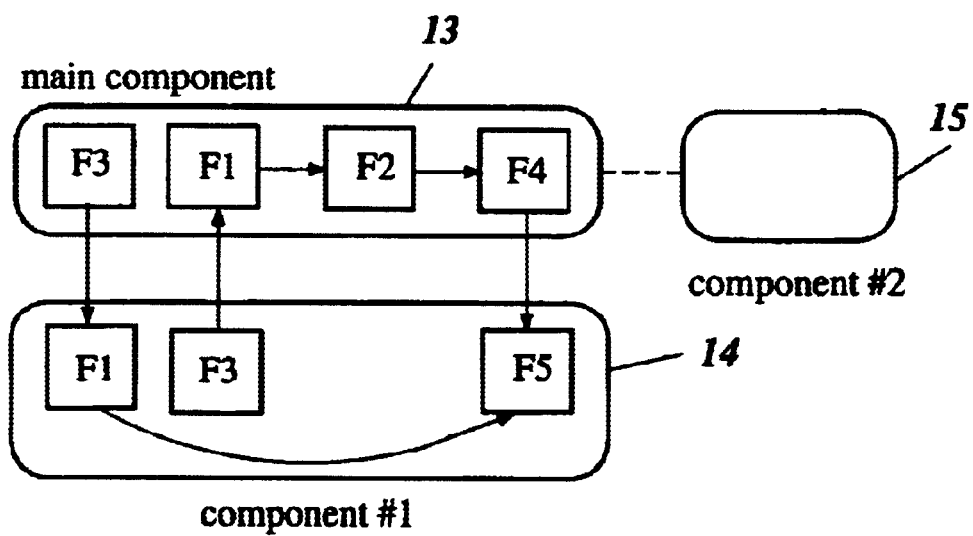
FIG. 3 is a schematic diagram showing another example of allocated function units between the modules.

The above units are allocated among modules. FIGS. 2 and 3 show examples. In FIG. 2, a replacable module 11 (component #1) comprises F3, F4, and F5. A replaceable module 12 (component #2) may comprise the same function units as above. A main module 10 (main component) comprises F1 and F2. In FIG. 3, F4 (action coordination unit) is located in a main module 13 instead of a replaceable module 14. Further, in this figure, because the replaceable module 14 comprises an action algorithm (F5), the algorithm can be adjusted in accordance with the main module 13. That is, the main module 13 further comprises an ID information unit (F3), and the replaceable module 14 further comprises an ID recognition unit (F1), wherein said action algorithm (F5) is adjusted by the ID information from the main module 13. In this embodiment, if a heavy main module is used instead of a light one, leg movement can be adjusted accordingly. A replaceable module 15 (component #2) may comprise the same function units as the replaceable module 14.

In the above, the main module and said at least one replaceable module are communicated via an interface.

According to these embodiments, the modules are replaceable, and each module comprises own control system and has an ID. The main module receives ID information from the replaceable module, and the decision algorithm provided in the main module is adjusted based on the ID information, so that proper control can always be accomplished adaptively to the used replacable module. For example, if the machine is a robot, the main module may be a body, and said at least one replaceable module may be selected from self-propelling legs, self-propelling wheels, and self-propelling caterpillars. Although their behavior is very different to accomplish the same task such as moving forward and turning right, the robot can accomplish the task after changing the modules.

In addition, in an embodiment, the emotion generation unit and the personality formation unit may be installed in the main module, and the new behavior generation unit may be installed in the replaceable module, although they need not be so allocated.

Figure 4:
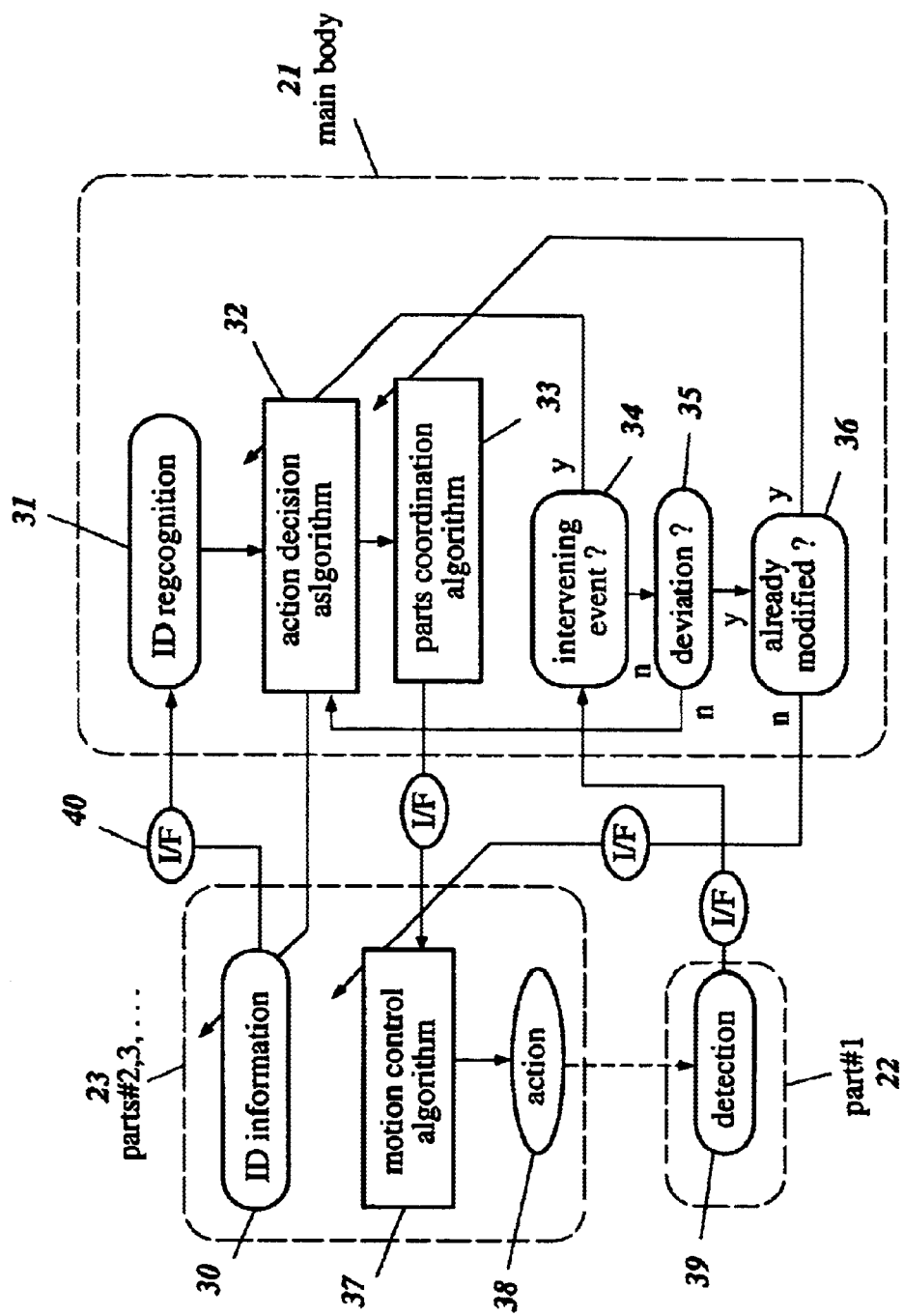
FIG. 4 is a schematic diagram showing an example of control flow of the machine.

FIG. 4 is a schematic diagram showing an example of control flow of the machine. In this figure, a replaceable module 23 (parts #2, . . . ) is connected to a main module 21 (main body), and another replaceable module 22 (part #1) is connected to the main module 21. The modules are communicated with each other via interfaces 40. When the module 23 is connected to the main module 21, ID information of the module 23 is provided from an ID information unit 30 to an ID recognition unit 31. The ID recognition unit 31 outputs signals, such as physical profiles and action threshold values specifically stored in the ID information unit 30, to an action decision algorithm 32. The above signals are parameters which regulate an outcome of the action algorithm. For example, if wheels are used, approaching action can be triggered more responsively to movement of a target, as compared with the use of caterpillars. The ID information can contain the above signals themselves to be transmitted or can contain minimum information to identify the module. In the latter, as shown in FIG. 5, the ID recognition unit 31 comprises a memory, and based on the information, necessary information can be retrieved from the memory (52). If no information is stored in the memory, default information will be provided (51).

Upon receiving the signals after the ID recognition, the action decision algorithm 32 selects an action to be performed. For example, if the selected action is "approaching a target located straight ahead at a high speed", the decision is outputted to an action coordination algorithm 33. The action coordination algorithm 33 has also received the ID information so that the algorithm can select an appropriate operation sequence of each module in order to accomplish the selected action. For example, if legs are used, movement of each leg must be well coordinated, as compared with the use of wheels, in order to accomplish the selected action. The action coordination algorithm 33 provided in the main module 21 then outputs signals to a motion control algorithm 37 provided in the replaceable module 23 via an interface 40. The motion control algorithm 37 outputs signals specifying an operation sequence of each motor used in the replaceable module 23. Based on the outcome, the module 23 is actuated to initiate an action.

In this embodiment, the module 22 is provided with a detection unit 39 programmed to detect a deviation 35 of the actuated action from the selected action or an intervening event 34 which interferes with accomplishment of the action. The deviation may occur in a case wherein the action is "approaching a target located straight ahead" but the machine drifts slightly, for example. The intervening event may occur in a case wherein the action is "approaching a target located straight ahead" but during the performance, the machine is hit. If the machine is hit while approaching the target, the action decision algorithm 32 may be modified so that "approaching" action will not be triggered easily with relation to the target. If there is no intervening event, but there is a deviation 35 (such as slightly drifting to the right), the motion control algorithm 37 is modified to adjust the drifting. If the modification is not sufficient (36), the action coordination algorithm 33 is modified to adjust the movement of each module. If there is no deviation, the action continues by returning to the action decision algorithm 32.

After the task, i.e., the selected action, is accomplished, the parameters used finally at the action decision algorithm are provided to the ID information 30. For example, if the machine refrains from approaching a particular target because the machine was hit, the information is saved in the ID information of the replaceable module. Accordingly, the machine can learn and adjust the control system.

The units described above can be allocated in different ways, and other unit such as an emotion generation unit can be added. Further, the present invention cam applied not only to a physically moving machine but also to a computer created virtual machine on a display monitor.

Figure 6:
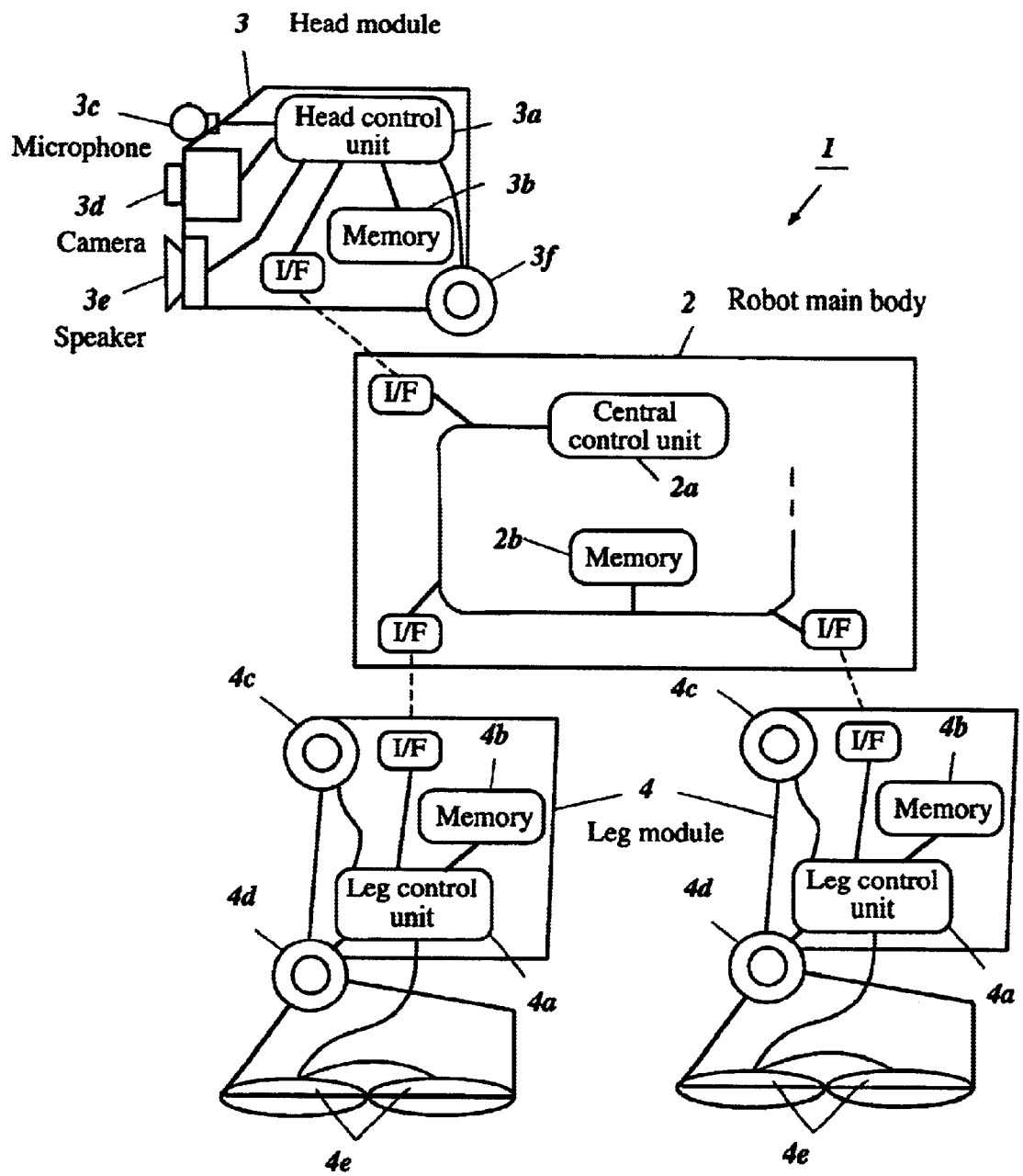
FIG. 6 is an entire configuration diagram showing one embodiment of a machine control system according to this invention.

FIG. 6 is an entire configuration diagram which shows one embodiment of a machine control system according to this invention. Additionally, although this embodiment indicates an example which applies to a robot device, it can apply to the above-mentioned various machines.

A device which comprises a robot device 1 comprises a robot main body 2, a head-part module 3 and multiple leg-part modules 4. The head-part module 3 and leg-part modules 4 are made to easily be attached to and detached from the robot main body 2. Additionally, the replacement modules are not limited to these, and various kinds such as a tail, a feather, etc. can be used.

The robot main body 2 has a central control part 2a to which a memory (a storage means) 2b and an interface I/F are connected. The head-part module 3 has a head-part control part 3a to which a microphone 3c as an auditory detecting means, a camera 3d as a visual detecting means, a speaker 3e as an auditory emotion-expressing means (for cries, etc.) and a motor for driving a neck joint 3f are connected. Each of the leg-part modules 4 has a leg-part control part 4a to which a memory (a storage means) 4b and an interface I/F are connected, and a motor for driving a knee joint 4c, a motor for driving an ankle joint 4d and a sensor 4e as a tactile detecting means are also connected. The interface I/F of the robot main body 2 is interconnected to the interfaces I/F of each of module 3 and 4 respectively.

Multiple types of replacement modules are available for the head-part module 3 and the leg-part modules 4 and can be replaced at will at the user's request. For example, for the head-part module 3, a module type which is equipped with an actuator showing facial expressions such as eyes, the mouth, eyebrows, ears, etc. or a module type which is equipped with a display showing facial expressions are available. For the leg-part module, a module type which can walk with legs and a module type which moves with a caterpillar are available. As to shapes, animal types such as a dog type and a cat type or other existent or imaginary creatures, and further, a human-like replacement module, etc. are available. Each of the memories 3b and 4b of the modules 3 and 4 respectively house a basic program for operating each module.

Figure 7:
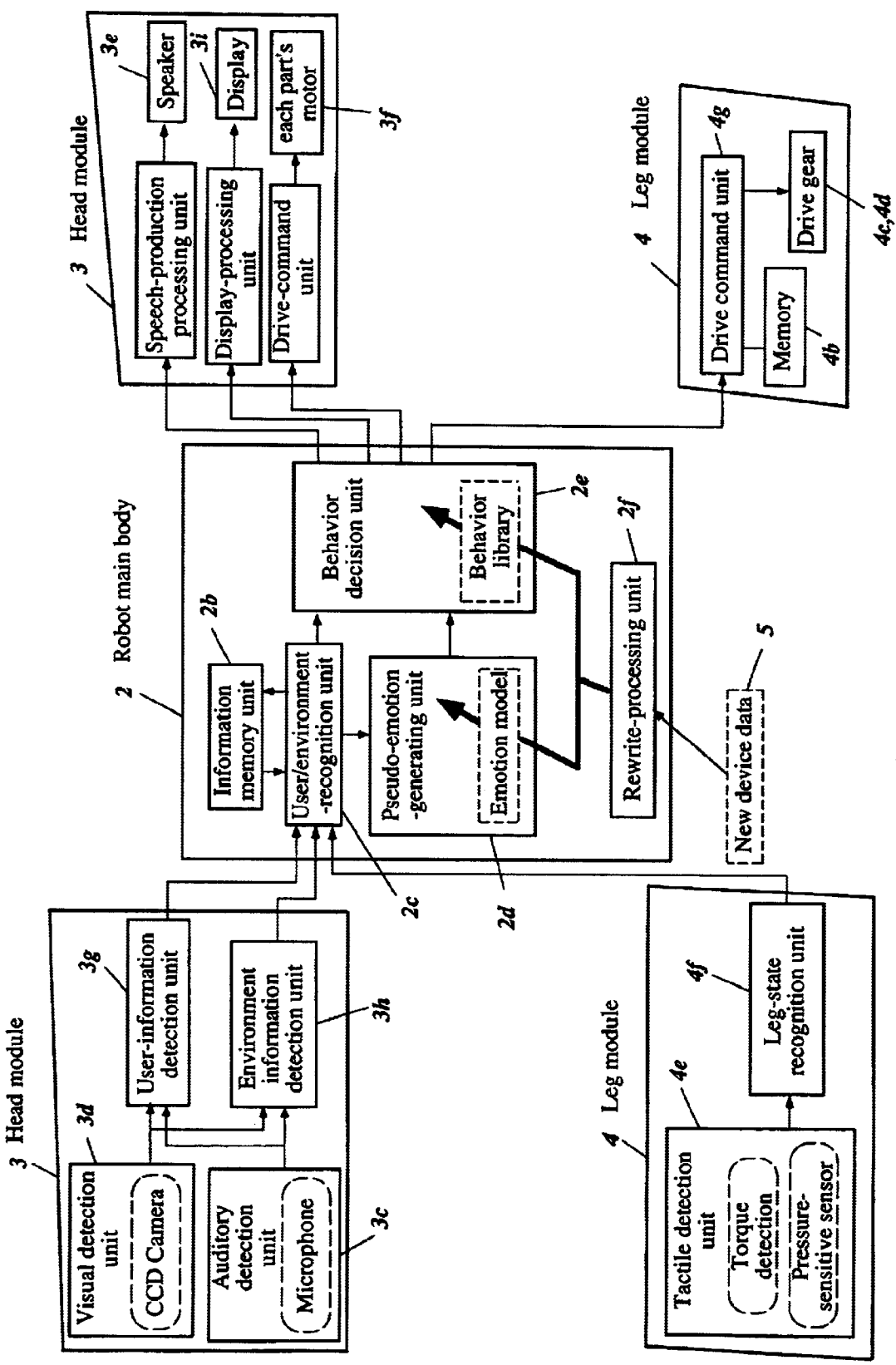
FIG. 7 is a configuration diagram of the control system of FIG. 6.

FIG. 7 is a configuration diagram of a control system. Signals detected by the visual detecting means (a CCD camera) 3d provided in the head-part module 3 and the auditory detecting means (a microphone) are transmitted to a user-information detecting part 3g and an environment-information detecting part 3h. The user-information detecting part 3g detects the user's face, actions and voice and the environment-information detecting part 3h detects external environment (the degree of brightness in a room, obstacles, etc.) seen from the robot and the information obtained is sent to the user/environment recognizing part 2c. Signals detected by the tactile detecting means (torque detection or a pressure-sensitive sensor) provided in the leg-part module 4 are transmitted to a leg-state recognizing part 4f. Contact with an obstacle, etc. is detected here and the information obtained is sent to the user/environment recognizing part 2c.

The information in the user/environment recognizing part 2c is sent to a quasi-emotion generating part 2d and quasi-emotions of the robot are generated here based on a stored emotion model. The emotion model is a calculation formula to compute parameters such as anger, sadness, joy, fear, aversion, fatigue, hunger, sleepiness, etc., which express the robot's emotions and the robot's emotions are generated according to the user information (the user's mood, orders, etc.) detected by sounds or images and the environment information (the degree of brightness in a room, etc.). For example, when the user returns home, the robot expresses an emotion of "joy" and if a stranger enters, it expresses an emotion of "anger". At this time, by an action of the user such as praising or scolding, the robot's emotions are changed and made to adapt. An emotion model is created beforehand so that the robot reacts by making childish motions when it is a baby and as it grows, it makes adult motions. The character and behaviors of the robot growing up in this way are stored in the information memory part 2b and learning processing is performed. Further, by learning processing, it is possible to make the robot learn tricks such as 'Sit', 'Give me your hand', etc.

The information in the user/environment-recognizing part 2c and the quasi-emotion-generating part 2d is sent to a behavior-deciding part 2e and the robot's behavior is decided here by referring to a behavior library. The behavior library is a motion sequence for the robot to make a particular expression and is stored in the memory of each module. Table 1 explains behavior library examples and shows behavioral patterns of the leg-part module when it moves with a caterpillar and walks with legs. For example, if a behavior name is "advance", behavioral patterns stored are to "make one normal rotation right and left at an equal speed" for a caterpillar and to "move each leg in the designated order" for legs. If a behavior name is "change direction", behavioral patterns stored are to "rotate left and right conversely" for a caterpillar and to "move each leg in the designated order" for legs. If a behavior name is "dance", behavioral patterns stored are to "repeat advancing, change direction and take turns randomly" for a caterpillar and to "fold hind legs in a sitting posture and raise and lower front legs alternately" for legs.

TABLE 1

| Behavior Name | For Caterpillar | For Legs |
| --- | --- | --- |
| Advance | Make one normal rotation right and left at an equal speed | Move each leg in the designated order |
| Change Direction | Rotate left and right conversely | Move each leg in the designated order |
| Dance | Repeat advancing, change direction, and turn randomly | Fold hind legs in a sitting posture and raise and lower front legs alternately |

Information decided by the behavior-deciding means 2e is sent to the head-part module 3 and is processed by an occurrence-processing part, an indication-processing part or a drive-commanding part accordingly and, for example, cries are outputted from the speaker 3e and facial expressions are outputted from the display 31 or each part's motor 3f is started and, for example, the selected behavior pattern such as head-shaking is performed. The information decided by the behavior-deciding means 2e is also sent to the leg-part module 4 and is processed by the drive-commanding part 4g, and the running gears 4c and 4d are started and behavior patterns explained in FIG. 3 are performed. At this time, the character and behaviors of a robot which has developed by learning are stored in the memory 4b.

What is characterized in this invention is that when each of modules 3 and 4 is replaced, new device data (new data or updated data) 5 which are stored in the memories 3b and 4b of each module is sent to the rewrite-processing part 2f of the robot main body 2 and the rewrite-processing part 2f rewrites the existing emotion model and behavior library.

Figure 8:
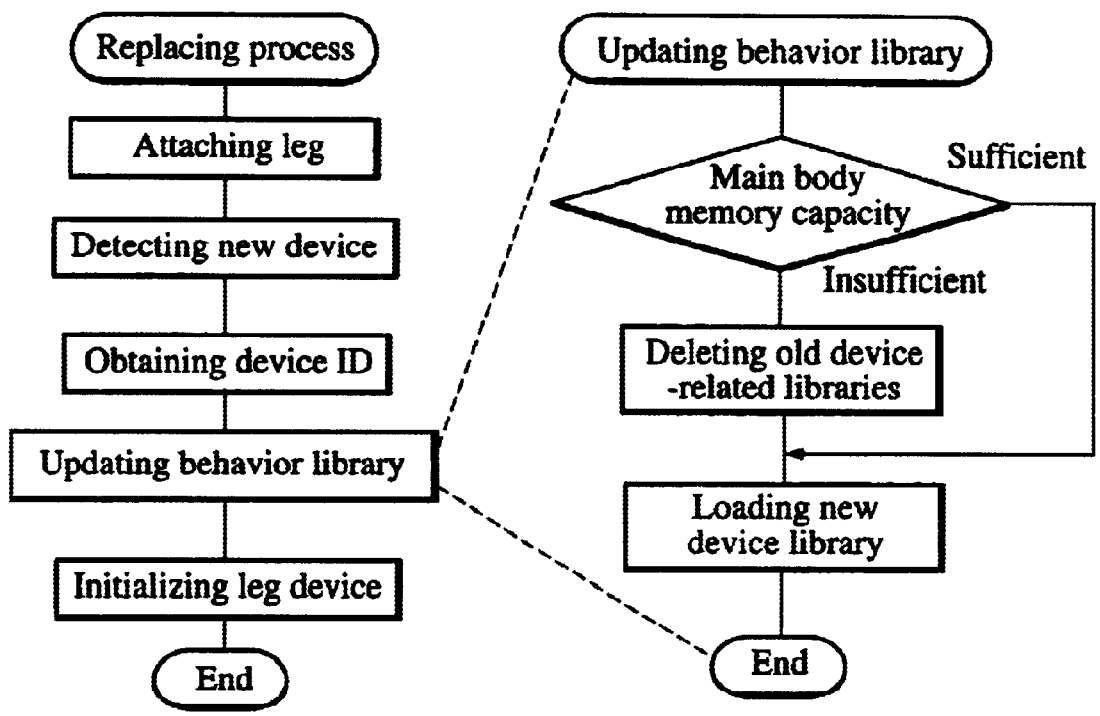
FIG. 8 is a flow chart to explain an example of the replacement processing of a module (device).

FIG. 8 is a flow chart to explain the replacement process of a module (device). When a leg is attached, after the leg is detected as a new device, a device ID is obtained, the behavior library is updated, the leg device is initialized. The updating processing of the behavior library determines whether the main body memory has sufficient space and if it does not, after the old device-related libraries are deleted, the library of the new device is loaded. If sufficient memory space exists, loading the library of the new device begins.

With this processing, it is possible not only to make a robot perform a different behavior when a module is replaced, but also to make it start from the point learned when re-attaching a previously used module. A behavior change becomes possible, for example, from a dog-like motion to a horse-like motion by attaching a longer leg. Additionally, key information, for example, "character" information or new behavioral pattern information, which manifests a new behavior when the robot learns and develops, is added to the memories 3b and 4b beforehand and at the time of attaching a device. Within the memory 2b of the robot main body, the memory is configured so that any areas, which due to learning are no longer used, are overwritten. For example, by saving learned results regarding how to move legs in the memory 4b of the leg-part module 4 and assembling into another robot main body the leg-part module 4 which has developed with the certain robot main body 2, it is possible to transmit specific action profiles to the other robot main body. Additionally, a stronger robot can be provided for fun by replacing arms, etc. with those with higher competence and further through learning from playing a match against another robot.

In the above, the embodiments of this invention were explained, but this invention is not limited to the above-mentioned and various changes are possible. For example, operating a robot device as an electronic robot on a computer screen is possible. This invention can apply to all types of man-machine interfaces including those for toys, games, automobiles (such as navigation), public welfare such as nursing, industrial uses and others.

As known from the explanation above, according to this invention, a robot which grows larger appearance-wise every time a new module is replaced can be provided. Additionally, when the previous module is replaced for the second time, learning can be started from the second time use, hence a machine such as a robot which the user does not lose interest in can be provided.

The present invention includes the following various embodiments:

1) A machine control system which is equipped with (i) the main body of a machine, (ii) a replacement module which is made to be replaceable from the machine main body, (iii) a memory means which is provided in said replacement module and which stores a behavior library of said replacement module, and (iv) a behavior-deciding means which decides the behavior of the replacement module based on said behavior library and a memory means which stores said behavior library, which are provided in said machine main body, which machine is characterized in that when said replacement module is replaced, the behavior library within said machine main body is rewritten by the behavior library of the replacement module.

2) The machine control system according to Item 1, wherein it is characterized in that said machine main body is a robot device and said replacement module comprises a head-part module and leg-part modules.

3) The machine control system according to Item 2, wherein it is characterized in that said head-part module is equipped with a detecting means which detects user information and environment information.

4) The machine control system according to Item 3, wherein it is characterized in that it is equipped with an emotion-generating means which generates a robot's emotions based on said user information and environment information.

5) The machine control system according to any one of Items 1 to 4, wherein it is characterized in that behaviors decided by said behavior-deciding means are learned and the learned results are stored in the machine main body and the memory means of a replacement module.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. A machine, functioning as a unit, composed of a main module and at least one replaceable module having an ID, said main module comprising (i) an ID recognition unit programmed to receive ID information from each replaceable module, and (ii) an action decision unit comprising a decision algorithm programmed to select an action based on preselected signals, said decision algorithm being adjusted based on the ID information;

said at least one replaceable module comprising (iii) an ID information unit storing ID information identifying said at least one replaceable module, wherein said ID information includes action threshold values at which predetermined actions are triggered, and said decision algorithm includes action thresholds which are updated by said action threshold values, and (iv) an action actuation unit comprising an action algorithm programmed to actuate said at least one replaceable module based on signals from said action decision unit; wherein said main module and said at least one replaceable module are communicated via an interface, one of the modules being provided with a detection unit programmed to detect a deviation of the actuated action from the selected action, and at least either of said action algorithm or said decision algorithms being modified in predetermined order based on the deviation, wherein when the action threshold values used in the decision algorithm are modified, the modified values are saved in the ID information unit of the replaceable module.

2. The machine according to claim 1, wherein said ID information includes minimum information to identify the module, and said ID recognition unit further comprises a memory storing (a) action profiles and action threshold values at which predetermined actions are triggered with reference to each ID, and (b) default profiles and action threshold values, wherein if the received ID is not new, corresponding information is retrieved from the memory, and if the received ID is new, the default information is used.

3. The machine according to claim 1, wherein said at least one replaceable module is at least two replaceable modules, and said main module further comprises an action coordination unit provided downstream of the action decision unit to coordinate actions of the respective replaceable modules, wherein said action actuation units receives signals from said action coordination unit.

4. The machine according to claim 1, wherein said main module further comprises and ID information unit storing ID information including profiles of said main module, and said at least one replaceable module further comprises and ID recognition unit programmed to receive ID information from said main module, wherein said action algorithm of said action actuation unit is adjusted by the ID information from said main module.

5. The machine according to claim 1, which is a robot wherein said main module is a body, and said at least one replaceable module is self-propelling legs, self-propelling wheels, or self-propelling caterpillars.

6. The machine according to claim 1, which is a robot wherein said main module is a body including a head provided with a sensing unit connected to the detection unit, and said at least one replaceable module is self-propelling legs, self-propelling wheels, or self-propelling caterpillars.

7. A set of replaceable modules set forth in claim 1, comprising self-propelling legs, self-propelling wheels, and self-propelling caterpillars.

8. A set of replaceable modules set forth in claim 1, comprising self-propelling arms having different power levels and different action threshold values.

* * * * *